(12) United States Patent
Vila

(10) Patent No.: US 6,588,803 B2
(45) Date of Patent: Jul. 8, 2003

(54) EXTENDIBLE P-TRAP DISHWASHER WASTE PORT

(76) Inventor: Robert M. Vila, 27146 Shannahan Rd., Sommerland Key, FL (US) 33042

( * ) Notice: Subject to any disclaimer, the term of this patent is extended or adjusted under 35 U.S.C. 154(b) by 0 days.

(21) Appl. No.: 09/945,960

(22) Filed: Sep. 4, 2001

(65) Prior Publication Data

US 2003/0042736 A1 Mar. 6, 2003

(51) Int. Cl.[7] .............................. F16L 43/00; E03C 1/12
(52) U.S. Cl. ............................... 285/134.1; 285/125.1; 4/679; 4/696
(58) Field of Search ................... 285/132.1, 134.1, 285/125.1, 135.1–135.5, 127.2; 4/679, 680, 681, 696

(56) References Cited

U.S. PATENT DOCUMENTS

| | | |
|---|---|---|
| 733,475 A | 7/1903 | Foley |
| 788,803 A | 5/1905 | Walker |
| 846,600 A | 3/1907 | Oakes |
| 884,326 A | 4/1908 | Emery |
| 954,852 A | 4/1910 | Colombo |
| 1,362,718 A * | 12/1920 | McNamara ............... 285/129.2 |
| 2,237,672 A | 4/1941 | Kennedy |
| 2,280,195 A | 4/1942 | Long |
| 2,303,949 A | 12/1942 | Nordell |
| 2,476,908 A | 7/1949 | Radcliffe |
| 2,566,654 A | 9/1951 | Collison et al. |
| 2,567,165 A * | 9/1951 | Bushkirk .................. 285/125.1 |
| 2,719,501 A * | 10/1955 | Murray ........................ 269/47 |
| 3,936,892 A | 2/1976 | Miller |
| 4,162,546 A * | 7/1979 | Shortell .......................... 4/191 |
| 4,181,330 A | 1/1980 | Kojima |
| 4,218,786 A * | 8/1980 | Taglarino ........................ 4/206 |
| 4,998,754 A | 3/1991 | Matsumoto et al. |
| 5,944,985 A * | 8/1999 | Bowman ..................... 210/153 |
| D413,648 S * | 9/1999 | Simpson et al. ........... D22/147 |
| 6,125,881 A | 10/2000 | Hobbs et al. |

* cited by examiner

Primary Examiner—Lynne H. Browne
Assistant Examiner—G M Collins
(74) Attorney, Agent, or Firm—Michael I. Kroll

(57) ABSTRACT

The present invention 10 discloses a p-trap 12 for commercial and residential plumbing systems wherein the p-trap 12 has an enlarged portion at 46 for receiving a drainpipe 20 and has a threaded port 22 to receive a pressure hose 16 for a dishwasher 14 waste line. Also disclosed is a deflection shield 24 disposed in operative connection to the threaded port 22 so as to direct waste water 50 downwardly away from the sink 18. The present invention 10 further includes a plurality of multiport PVC pipe fittings in various configurations to provide greater flexibility when plumbing.

1 Claim, 15 Drawing Sheets

EXTENDIBLE P-TRAP DISHWASHER WASTE PORT

BACKGROUND OF THE INVENTION

1. Field of the Invention

The present invention relates generally to p-traps for plumbing commercial and residential drainage systems and, more specifically to a p-trap that is extendible and has a threaded port to receive a pressure hose for a dishwasher waste line. The present invention further includes a plurality of multiport PVC pipe fittings in various configurations to provide greater flexibility when plumbing.

2. Description of the Prior Art

Numerous pipe fittings have been provided in prior art. Typical of these is U.S. Pat. No. 733,475 issued to T. F. Foley on Jul. 14, 1903.

Another patent was issued to F. Walker on May 2, 1905 as U.S. Pat. No. 788,803. Yet another U.S. Pat. No. 846,600 was issued to B. Oakes on Mar. 12, 1907 and still yet another was issued on Apr. 7, 1908 to V. J. Emery as U.S. Pat. No. 884,326. Another patent was issued on Apr. 12, 1910 to C. Colombo as U.S. Pat. No. 954,852. Another patent was issued to E. Kennedy on Jun. 22, 1939 as U.S. Pat. No. 2,237,672 and one more patent was issued on Apr. 21,1942 as U.S. Pat. No. 2,280,195 to H. Long. U.S. Pat. No. 2,303,909 was issued to C. H. Nordell on Jan. 13, 1940 and another patent was issued to G. F. Radcliffe on Sep. 7, 1946 as U.S. Pat. No. 2,476,908. Still another patent was issued to W. J. Collison et al. on Aug. 25, 1949 as U.S. Pat. No. 2,566,654. U.S. Pat. No. 3,936,892 was issued on Feb. 10, 1976 to Frederick A. Miller and still another U.S. Pat. No. 4,181,330 was issued to Noriatsu Kojima on Jan. 1, 1980. On Mar. 12, 1991 U.S. Pat. No. 4,998,754 was issued to Shigeyuki Matsumoto et al. and yet another patent was issued on Oct. 3, 2000 to Billy J. Hobbs as U.S. Pat. No. 6,125,881.

U.S. Pat. No. 733,475

Inventor: T. F. Foley

Issued: Jul. 14, 1903

The combination with the vessel, having the thickened upper portion, female screw-threaded and the groove, of the cover, provided with screw-threads and annular flange having the inner shoulder at the base thereof adapted to receive the lower end of the pipe, the sleeve engaging the threaded annular flange and the pipe, said pipe cover and annular flange formed of a single piece, the whole constructed and arranged, substantially as described.

U.S. Pat. No. 788,808

Inventor: F. Walker

Issued: May 2, 1905

A double drainage-fitting consisting of a soil-pipe section having a central chamber with lateral downwardly-curved inlet branches, the upper side of said branches terminating inside the chamber in deflectors at a point which is lower than the center of the inlets of the drainage branches.

U.S. Pat. No. 846,600

Inventor: Ben Oakes

Issued: Mar. 12, 1907

A water closet bend, its inlet screw-threaded to receive a flange, the flange having an opening eccentric to the threaded portion to receive a pipe connection leading to a closet, the construction being such that a slight lateral adjustment of the pipe with reference to the closet and the bend may be effected by rotating said flange, substantially as described.

U.S. Pat. No. 884,326

Inventor: Victor J. Emery

Issued: Apr. 7, 1908

A multiple cylinder engine having in combination a plurality of water jackets, a common water circulating device for supplying water thereto, a distributing device provided at one end with an inlet communicating with the circulating device, and at the opposite end with a plurality of outlets communicating with the respective water jackets, and with a partition between the adjacent outlets extending from the outlet end towards and in line with the inlet and so arranged that the inlet area is subdivided thereby into equal areas corresponding in number to the number of outlets opening, substantially as described.

U.S. Pat. No. 954,852

Inventor: Charles Colombo

Issued: Apr. 12, 1910

In a soil-pipe fitting, an elbow adapted to receive the end of the soil-pipe, a clean-out branch formed therewith, the lower portion of the innermost wall of the clean-out branch being confined within the elbow and deflected toward the rear wall of the elbow.

U.S. Pat. No. 2,237,672

Inventor: Edward Kennedy

Issued: Apr. 8, 1941

As a new article of manufacture, a plumber's fitting adapted to be interfitted with waste-stack sections in a building having numerous fixtures intended to be connected-in to said waste stack and requiring to be vented; said fitting comprising in a unitary structure a body provided with a central waste channel having spigot and socket terminals adapted to be connected into the waste stack, said body having a set of lateral inlets constructed and arranged to receive selectively from different sides of said channel lead-in connections from one or more of said plumbing fixtures, said body having a set of outlet openings from said central channel adapted to be connected selectively with vent pipes, and said body further having a cross-passage in communication with said central waste channel.

U.S. Pat. No. 2,280,195

Inventor: Hugh Long

Issued: Apr. 21, 1942

In a hollow fitting having openings for connection to a pair of oppositely directed conduits as well to another conduit that is angularly displaced from said pair, a wall forming a surface in said fitting opposite the opening for said other conduit, said surface having a sloping configuration extending substantially across the opening of said other conduit to guide substantially all of the liquid entering from said other conduit into one of the pair of oppositely directed conduits and away from the other of the pair, and a ridge extending partly around said surface and opposite the edge of said opening, and overhanging said surface, to prevent separation of the stream of liquid between said pair.

U.S. Pat. No. 2.303,949

Inventor: Carl H. Nordell

Issued: Jan. 13, 1940

A hydraulic fluid conduit bend having an outer curved surface of substantially segmentary circular form, an inner surface which conforms substantially to a segment of an ellipse having its minor axis in substantial alignment with the apex of the bend, said conduit having apical cross sectional area substantially 10% to 30% greater than the cross sectional area at the ends of the conduit, whereby the bend will offer a resistance to flow of the hydraulic fluid substantially less than that offered by a corresponding bend of uniform cross-sectional area.

U.S. Pat. No. 2,476,908

Inventor: George F. Radcliffe

Issued: Jul. 19, 1949

A double fitting for connecting the bends of two water closets with the main sewage run, comprising a pair of pipe members disposed in horizontal parallel relation and joined by and interjacent party wall; one of said members having a passageway therethrough formed to connect with the main run of pipe; and the other member having ends formed to connect with the bends of said closets and having two outlets leading from opposite directions through an opening in said party wall into said passageway; and a single curved directional partition vertically disposed inside and secured to said other member and positioned to discharge arcuately.

U.S. Pat. No. 2,566,654

Inventor: William J. Collison et al.

Issued: Sep. 4, 1951

A device comprising a fitting provided with a body, said body provided with horizontal openings, and short horizontal baffles in said body at the openings only and extending partly over said horizontal openings leaving the bore of the fitting clear.

U.S. Pat. No. 3,936,892

Inventor: Frederick A. Miller

Issued: Feb. 10, 1976

A plumbing fitting that is adaptable to be installed along any drain line so to permit the drain line to be easily and readily cleaned out in case it becomes clogged; the device consisting of a length of pipe having an internal screw thread at one end and an external screw thread at an opposite end for easy connection along the drain line, the length of pipe having a branch line extending from a side thereof and which is adaptable for receiving a clean-out rod or which may be attached to a hose, and a shut off valve cock being located along the main pipe so as to prevent back pressure up into a plumbing fixture such as a sink, tub or toilet.

U.S. Pat. No. 4,181,330

Inventor: Noriatsu Kojima

Issued: Jan. 1, 1980

A horn shaped multi-inlet pipe joint for connecting a vertical pipe or pipes to a horizontal main pipe. The pipe joint comprises a horn shaped body in which a clearance is formed for diffusing drainage from the pipes and a chute surface is provided for collecting the diffused drainage and leading it to the main pipe, and a cap having a plurality of openings to which the vertical pipe or pipes, a cleaning access lid or lids and the like are attached.

U.S. Pat. No. 4,998,754

Inventor: Shigeyuki Matsumoto

Issued: Mar. 12, 1991

In a vent-free single-duct drainage piping system for vertical installation in multi-storied buildings with horizontally extending branches to receive drain from sources of different floors of the building installed, a joint for connecting vertical pipe sections of the drainage piping system is disclosed, which comprises an upper pipe portion having a spiral axis between opposite end portions thereof and adapted for connection to the upstream side of the vertical drainage system to receive drain therefrom. A lower pipe portion is comprised of a first vertical passage connected in direct fluid flow relationship with the upper pipe portion and a second vertical passage having at a side thereof side ports adapted for connection to horizontal drainage pipes laid at a particular floor of the building. The first vertical passage receives drain from the upper pipe portion and the second vertical passage receives drain from the horizontal pipes. Both first and second passages merge at lower ends thereof into a common outlet port adapted for connection to the downstream side of the system. The helix of the upper pipe section is provided to reduce the velocity of the drain falling from the drainage system, thereby lessening pulsations and sounds developed in drain water.

U.S. Pat. No. 6,125,881

Inventor: Billy J. Hobbs et al.

Issued: Oct. 3, 2000

Improved outlet boxes are provided for installation in a wall to connect water supply lines and drain lines to the corresponding lines from an appliance. Molded plastic outlet boxes having dual drains; left-to-right reversibility; adaptability to multiple drain and inlet line configurations, including top, bottom and side inlets; inclined bottom walls with gutters and removable webs facilitating drainage; and rear walls with recesses accommodating flushable water supply line connections are disclosed. Dual drain connectors adapted to combine the flows from dual drain outlets into a single drainpipe and knock-outs with downwardly extending, elongated tabs are also disclosed.

While these pipe fittings may be suitable for the purposes for which they were designed, they would not be as suitable for the purposes of the present invention, as hereinafter described.

SUMMARY OF THE PRESENT INVENTION

The present invention discloses a p-trap for commercial and residential plumbing systems wherein the p-trap has an enlarged outlet portion to receive a drainpipe and has a threaded port to receive a pressure hose for a dishwasher waste line. Also disclosed is a deflection shield disposed in operative connection to the threaded port so as to direct waste water downwardly away from the sink. The present invention further includes a plurality of multiport PVC pipe fittings in various configurations to provide greater flexibility when plumbing.

A primary object of the present invention is to provide a p-trap for sink applications having a threaded port for receiving a pressure hose from a dishwasher waste line.

An additional object of the present invention is to provide a p-trap that is extendible thereby allowing a plumber to compensate for an incorrectly roughed-in drainpipe.

A still further object of the present invention is to provide a p-trap with a dishwasher waste line port wherein the p-trap has an interior deflection shield to direct the effluence from the dishwasher waste line downward and prevent it from splashing back into the sink.

Still another object of the present invention is to provide a three way combination pipe fitting for use in roughing-in 2 bathrooms back to back with its own stack for 2 sinks or 1 sink and 1 urinal as well as other rough-ins.

A further object of the present invention is to provide a variety of basic modified plumbing fittings.

Another object of the present invention is to provide an extendible p-trap with a dishwasher waste port and modified pipefittings that are economical in cost to manufacture.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

Figure 1:
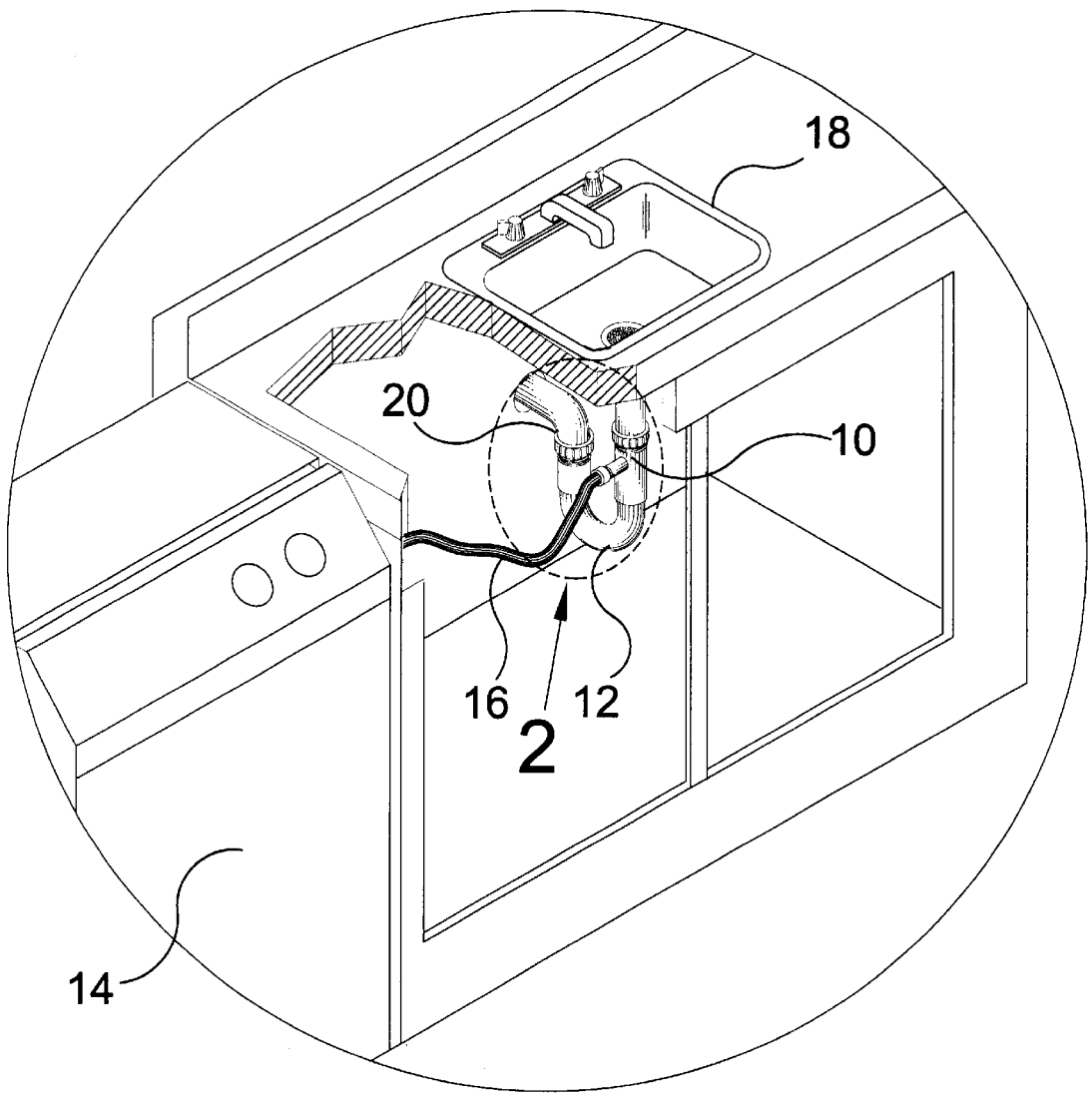
FIG. 1 is a perspective view of the present invention in use.

With regard to reference numerals used, the following numbering is used throughout the drawings.

10 present invention
12 p-trap
14 dishwasher
16 dishwasher outlet line
18 kitchen sink
20 drainpipe
22 dishwasher outlet line connector
24 deflection shield
26 drainpipe extension
28 tailpiece
30 tailpiece lock nut
32 countertop
34 drainpipe lock nut
36 water supply line
38 faucet
40 handle
42 sink drain
44 slip nut
46 drainpipe extension fitting
48 threads
50 waste water
52 2-way inlet
54 2-way inlet
56 Y-inlet

DESCRIPTION OF THE PREFERRED EMBODIMENT(S)

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Turning to FIG. 1, shown therein is a perspective view of the present invention 10 in use showing an extendible p-trap or trap 12 with a dishwasher 14 with dishwasher outlet hose 16 installed in a kitchen sink 18 with the dishwasher waste line 16 attached thereto. The present invention 10 allows a plumber to lower the elevation of the trap 12 when the drainpipe 20 is incorrectly roughed-in to the wrong elevation and to directly connect the dishwasher waste line 16 to trap 12 without modifications.

Figure 2:
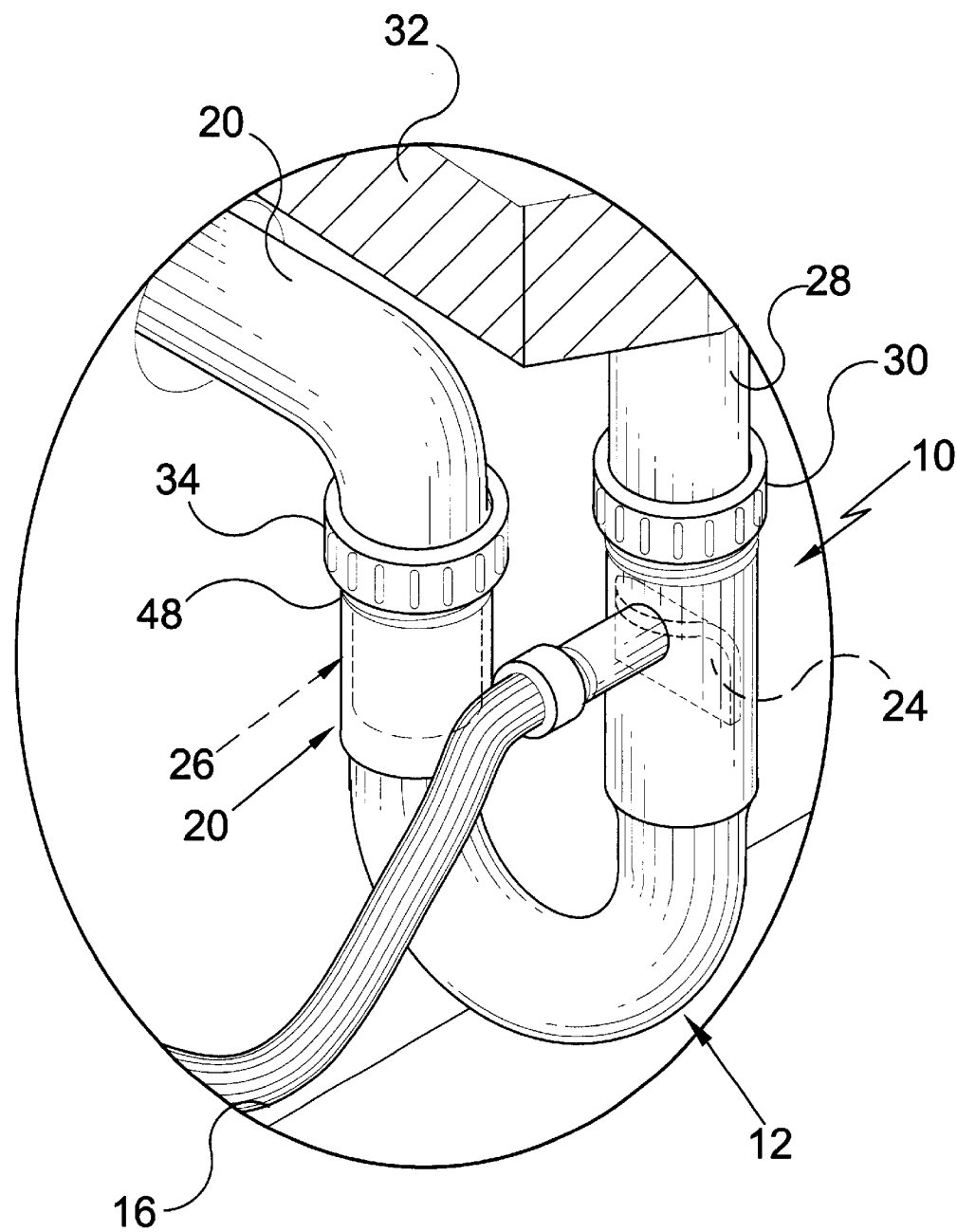
FIG. 2 is detailed view of the present invention in use taken from FIG. 1 as indicated.

Turning to FIG. 2, shown therein is a detailed perspective view of the present invention 10 in use taken from FIG. 1 as indicated wherein the dishwasher waste port connector 22 has a dishwasher waste outlet line 16 attached thereto. The deflection shield 24 is shown in hidden line centrally located within the fitting and above and in front of the dishwasher waste port connector 22 and serves to deflect dishwasher waste fluid downward toward trap 12 rather than splashing against the opposing wall of the fitting where it could splash back up into the sink. The threaded portion 48 of the p-trap 12 by the drainpipe 20 acts as a female fitting to accommodate a drainpipe extension 26. When a drainpipe 20 is incorrectly roughed-in the drainpipe extension 26 allows a plumber to compensate for the difference in elevation by inserting the drainpipe extension 26 into the p-trap 12 accordingly. Also shown is the sink tailpiece 28, tailpiece lock nut 30, countertop 32, and drainpipe lock nut 34.

Figure 3:
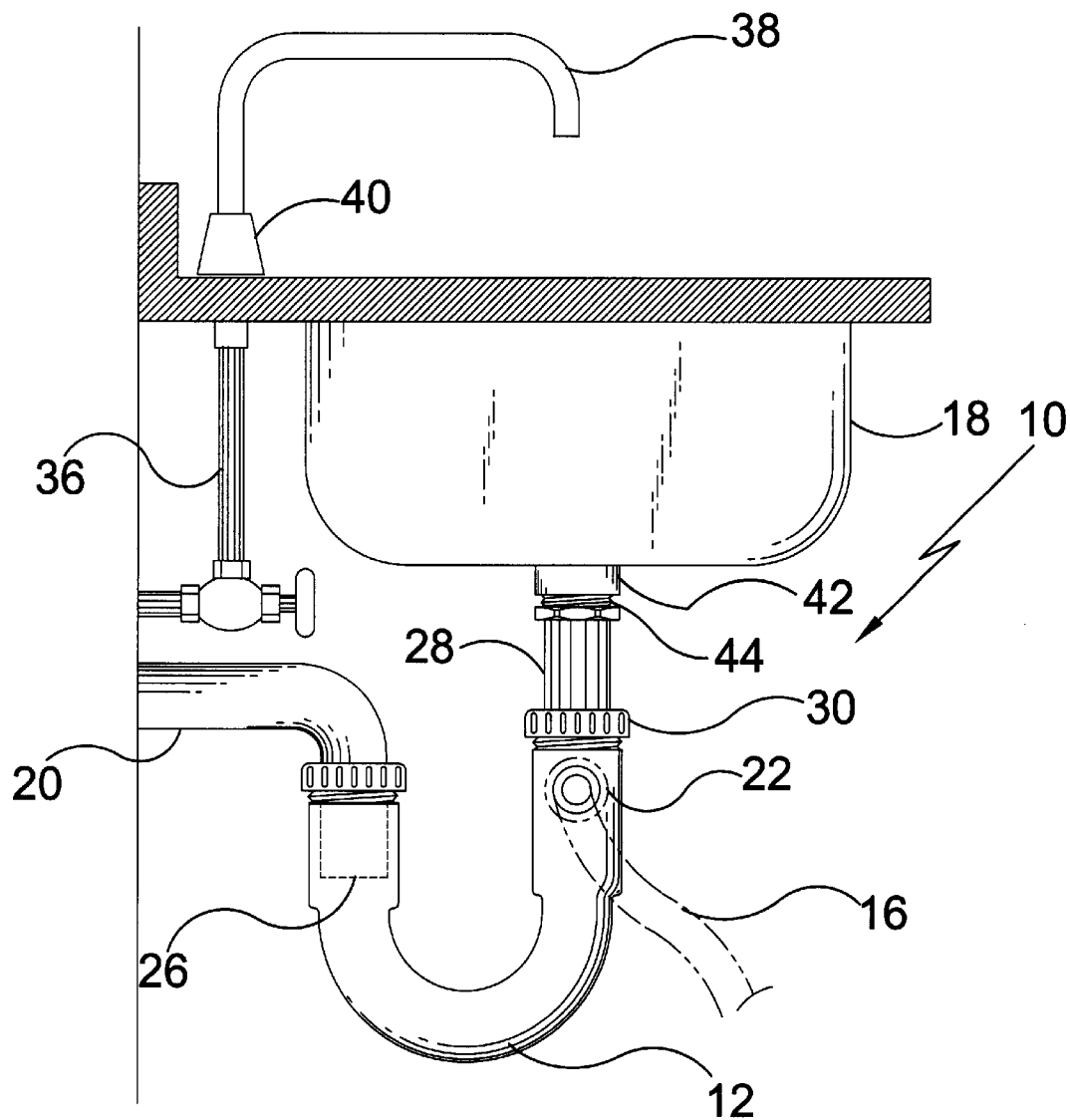
FIG. 3 is a side view of the present invention in use.

Turning to FIG. 3, shown therein is a side view of the present invention 10 installed on a kitchen sink 18 with an incorrectly roughed-in drainpipe 20 that requires the p-trap 12 to be lowered accordingly with extension 26 in order for the inlet side of the p-trap 12 to line up with the tailpiece 28 and the outlet side to mate with drainpipe 20 appropriately. Also shown are the water supply line 36, faucet 38, handle 40, sink drain 42, slip nut 44, along with other elements previously disclosed.

Figure 4:
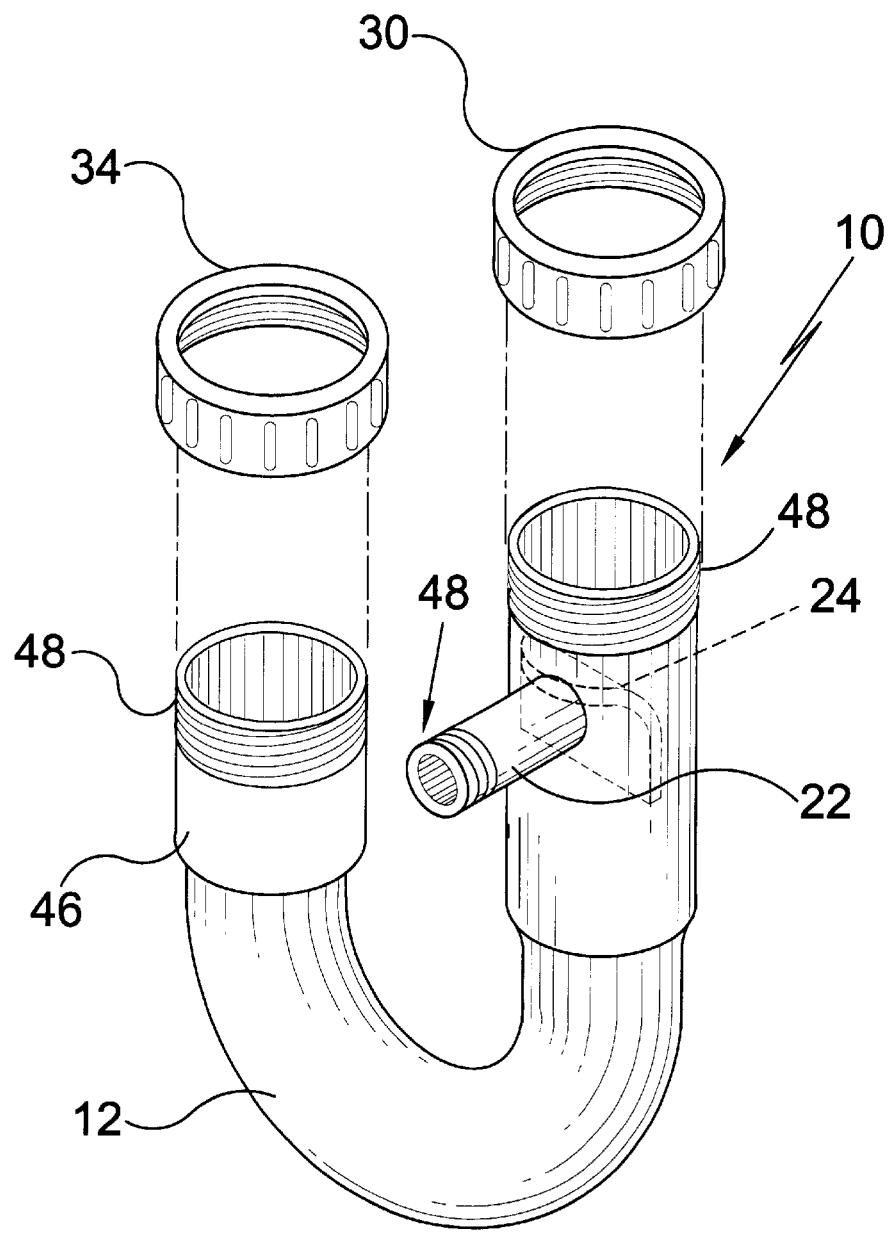
FIG. 4 is an exploded perspective view of the present invention.

Turning to FIG. 4, shown therein is an exploded view of the present invention 20 showing the enlarged drainpipe extension fitting 46 on the outlet end of trap 12 for receiving the drainpipe that provides the vertical adjustability of the trap 12 to compensate for an incorrectly roughed-in drainpipe depending on how far the drainpipe extension is inserted into the p-trap. Fitting 46 has a slightly greater diameter than the drainpipe. Threaded portions 48 of all fittings are shown. Other elements previously disclosed are also shown.

Figure 5:
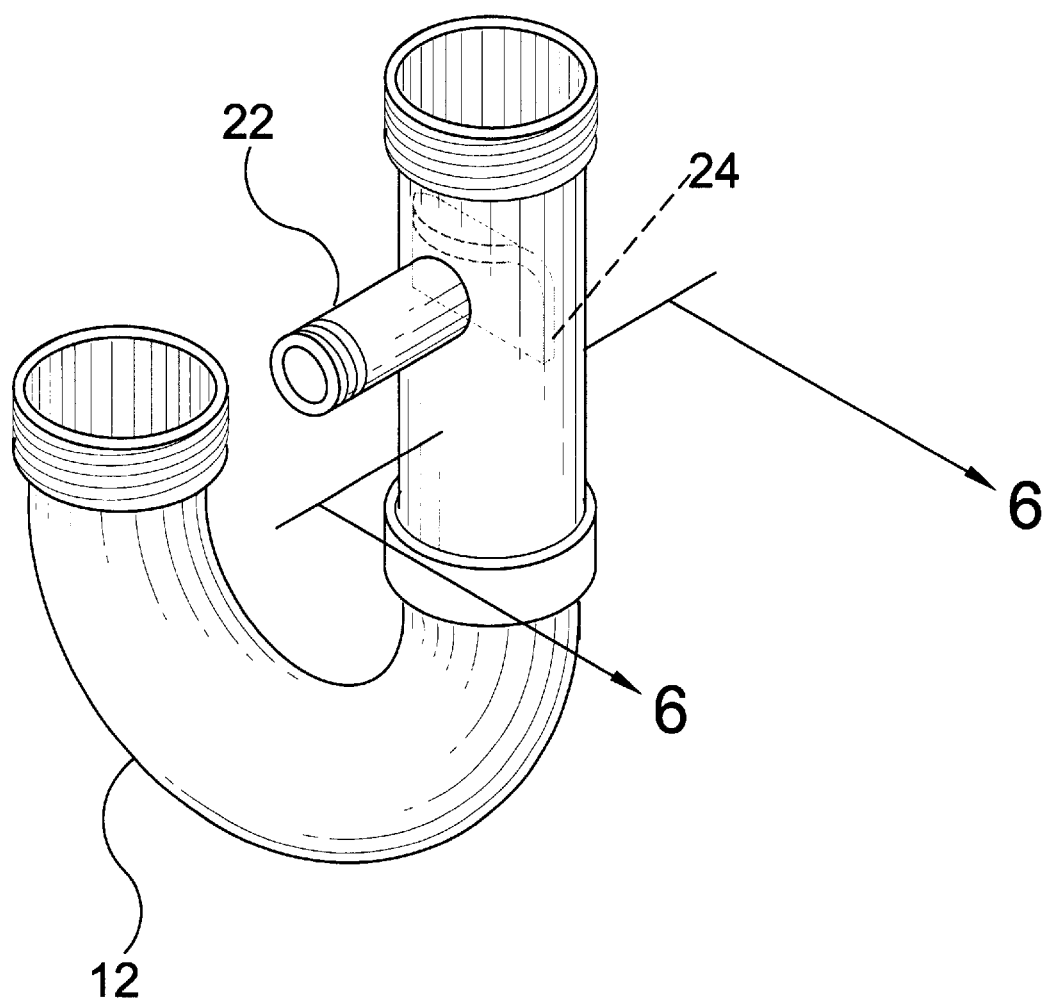
FIG. 5 is a perspective view of the present invention with the threaded dishwasher waste port and no extension option on the p-trap.

Turning to FIG. 5, shown therein is a perspective view of a p-trap 12 with a threaded port 22 and deflection shield 24 to accommodate a dishwasher pressure hose but without extension capabilities.

Figure 6:
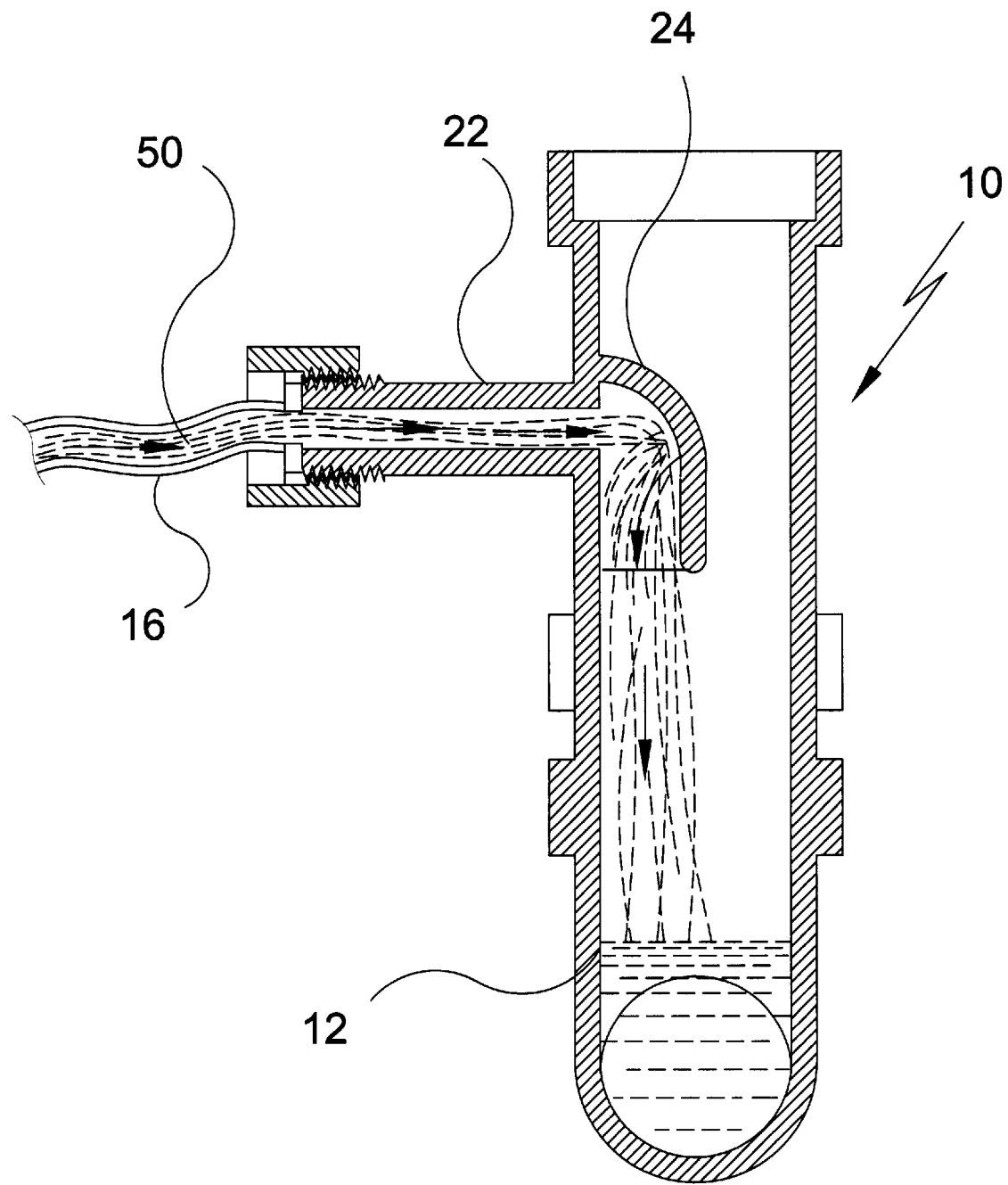
FIG. 6 is a cross-sectional side view of the present invention taken from FIG. 5 as indicated.

Turning to FIG. 6, shown therein is a cross-sectional side view of the present invention 10 taken from FIG. 5 as indicated illustrating the function of the deflection shield 24 as it directs the dishwasher waste water 50 downward to prevent it from splashing back into the sink. Shield 24 attaches to the wall of the present invention above the top of inlet port 22 and the curved portion of the shield 24 extends to a point slightly below the bottom of inlet 22 so as to direct the waste water downwardly away from the sink Other elements previously disclosed are also shown.

Figure 7:
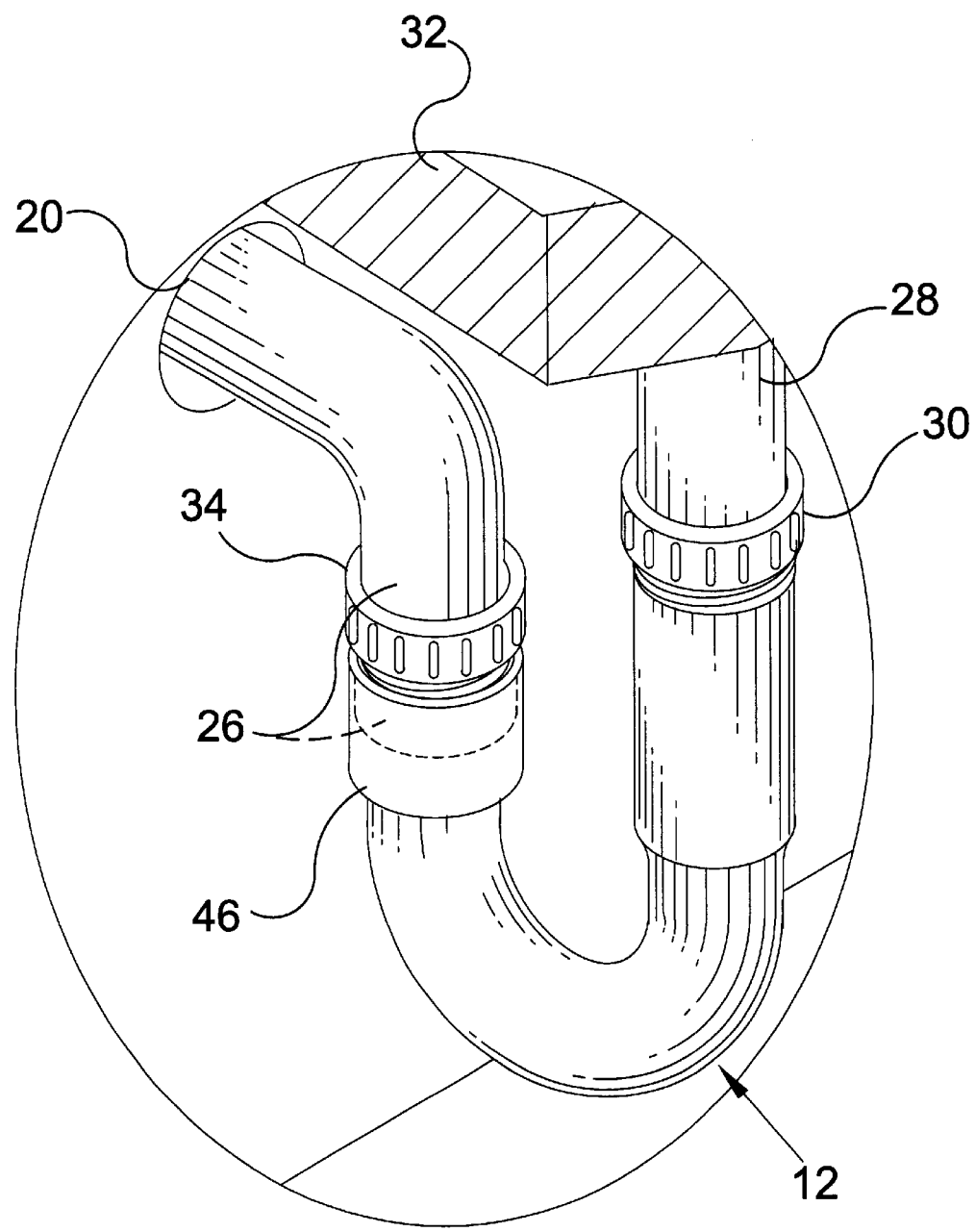
FIG. 7 is a perspective view of the present invention having an extendible p-trap and no dishwasher waste port.

Turning to FIG. 7, shown therein is a detailed perspective view of an extendible p-trap 12 in use without a dishwasher waste port. The drainpipe extension 26 with lock nut 34 is minimally inserted into the enlarged drainpipe extension fitting 46 thereby effectively lowering a drainpipe 20 that is roughed-in too high. In conventional traps, the diameter of the trap 12 and drainpipe 20 are about the same so that drainpipe 20 cannot be inserted into trap 12. However, the present invention provides an enlarged fitting 46 portion for receiving drainpipe 20. Other elements previously disclosed are also shown.

Figure 8:
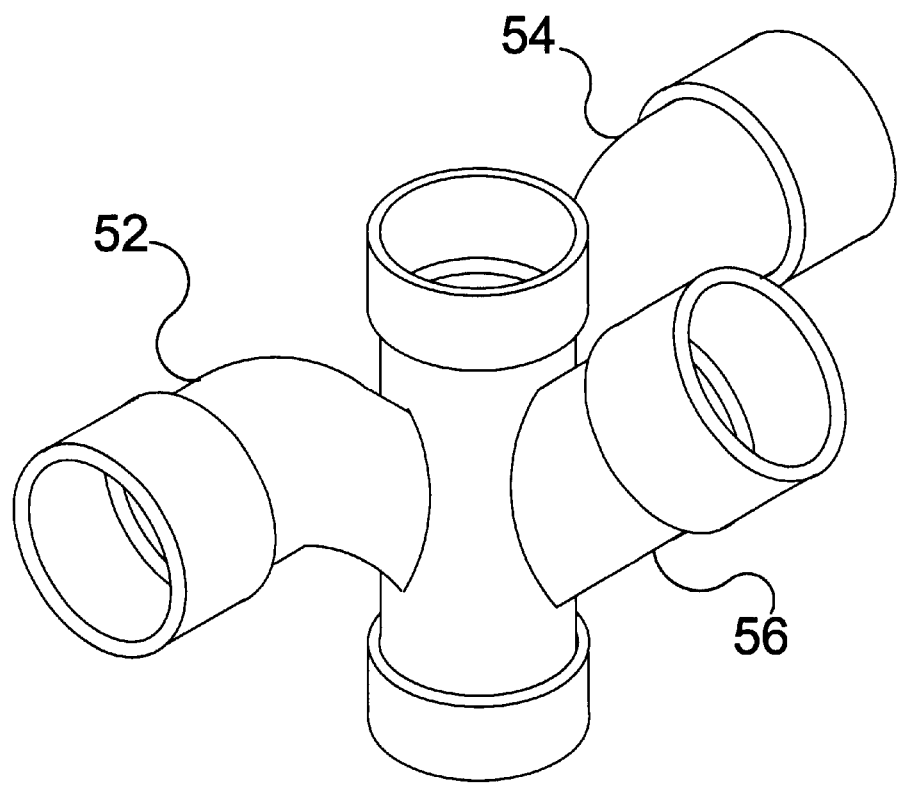
FIG. 8 is a perspective view of a two-way combination fitting with a Y-inlet.

Turning to FIG. 8, shown therein is a variation of the present invention showing a perspective view of a two-way combination 52, 54 with a Y-inlet 56 which can be used for single bathrooms or two bathrooms that are back to back.

Figure 9:
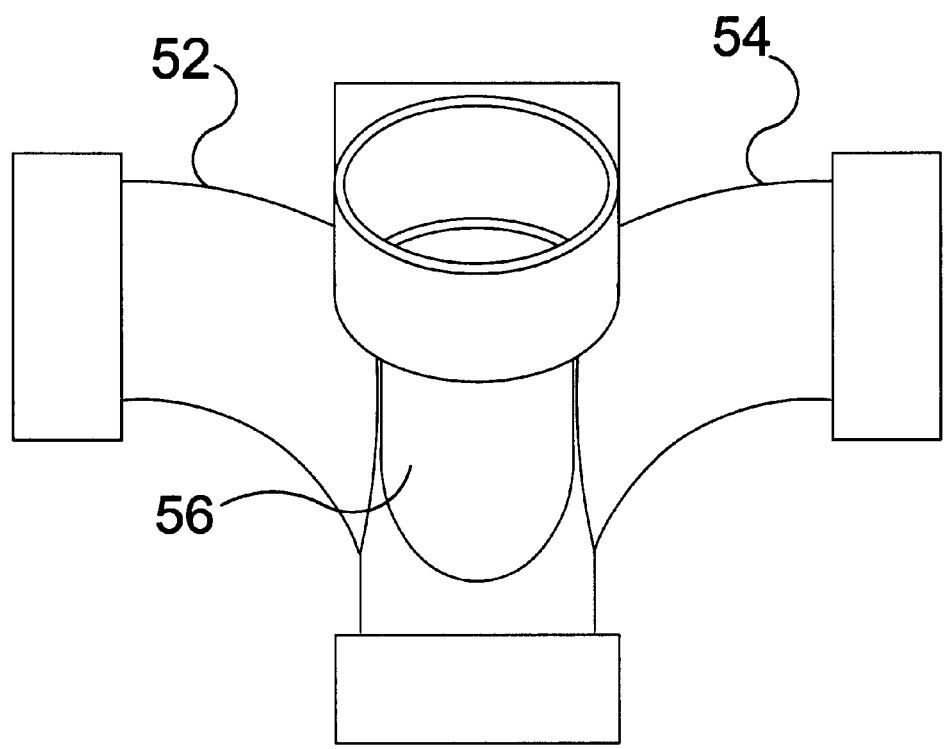
FIG. 9 is a front view of a two-way combination fitting with a Y-inlet.

Turning to FIG. 9, shown therein is a variation of the present invention showing a front view of a two-way combination 52, 54 with a Y-inlet 56 which can be used for single bathrooms or two bathrooms that are back to back.

Figure 10:
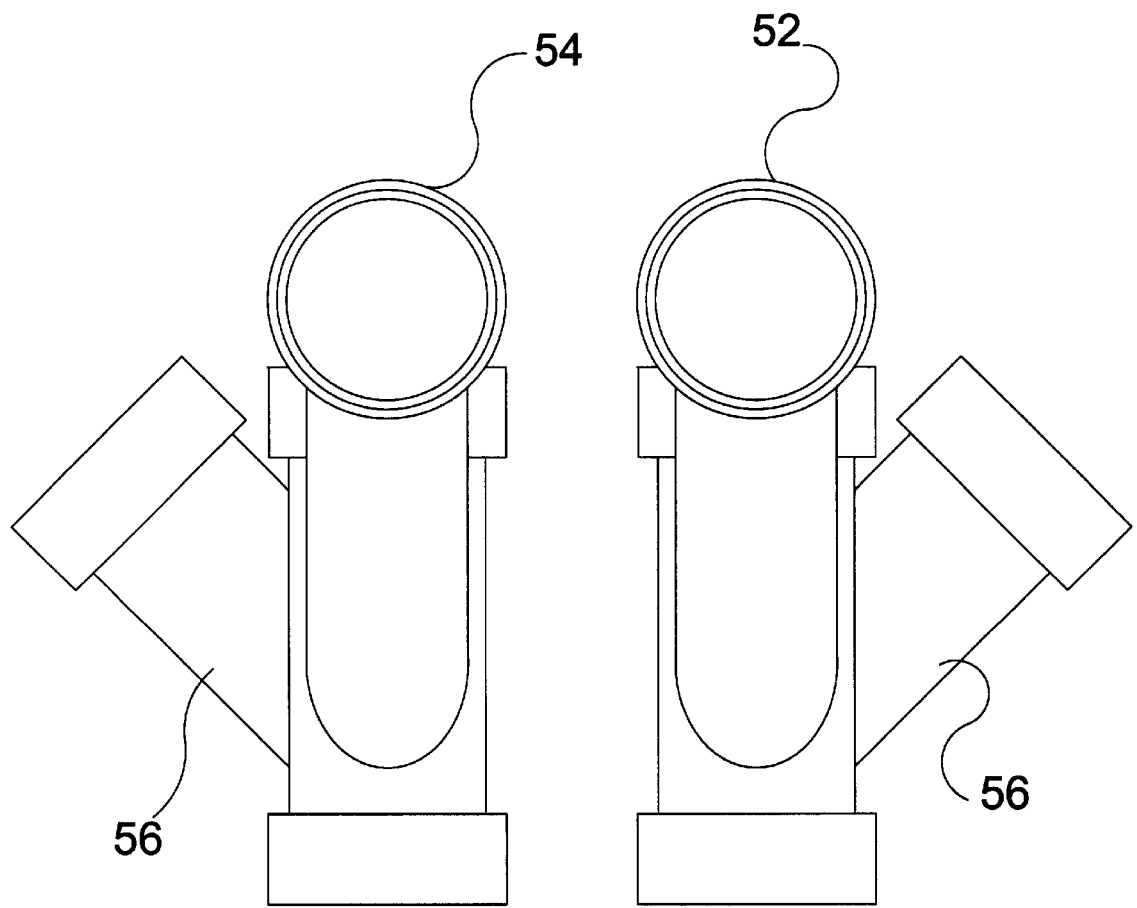
FIG. 10 is a side view of a Y-fitting with a combination.

Turning to FIG. 10, shown therein is a variation of the present invention showing a side views of a right 54 and a left 52 Y-fitting 56 with a combination. This fitting could be either right 54 or left 52 when ordering if the Y 56 is on the opposite side.

Figure 11:
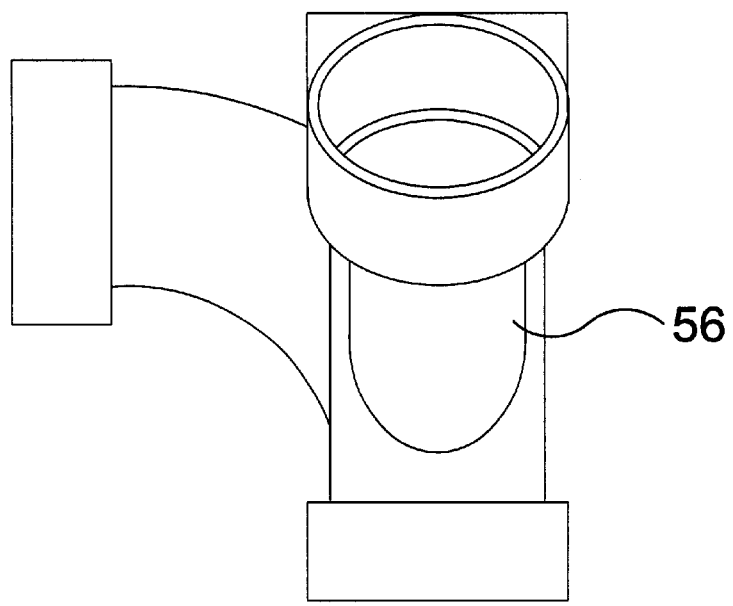
FIG. 11 is a front view of a Y-fitting with a combination.

Turning to FIG. 11, shown therein is a variation of the present invention showing a perspective view of a Y-fitting 56 with a combination. This fitting could be either right or left when ordering if the Y is on the opposite side.

Figure 12:
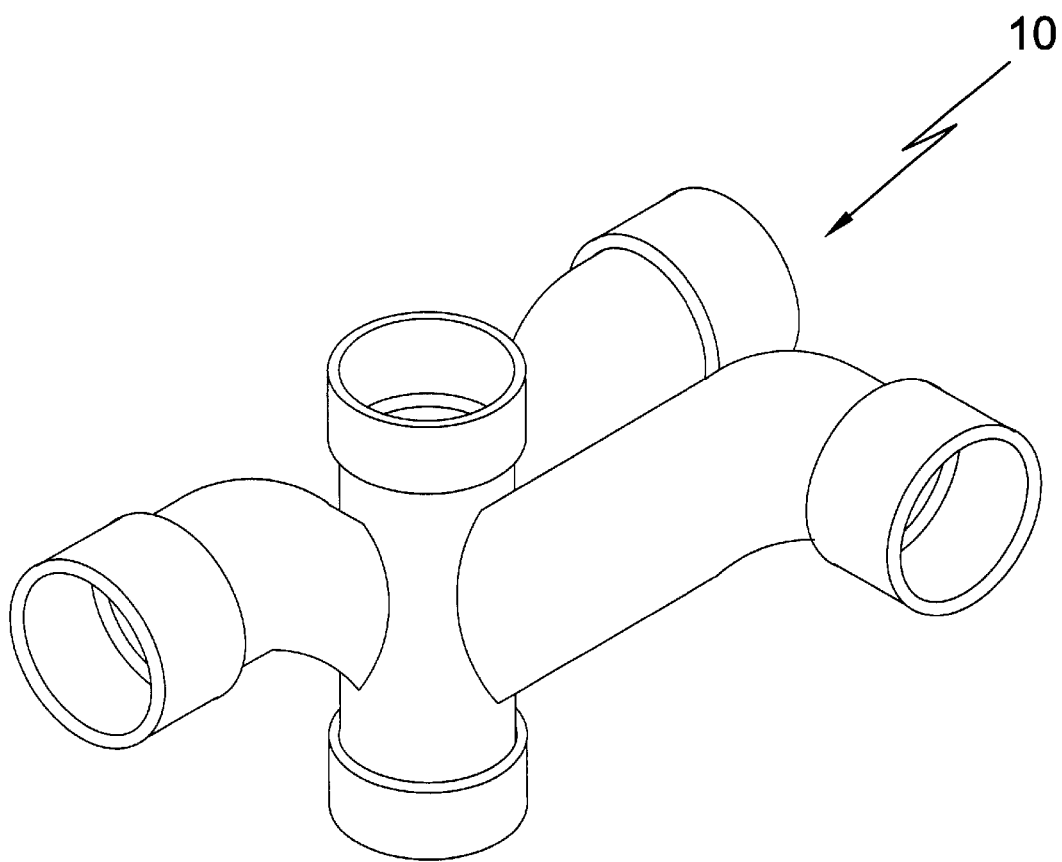
FIG. 12 is a perspective view of a three way combination fitting.

Turning to FIG. 12, shown therein is a perspective view of a variation of the present invention showing a 3-way combination to be used for a rough-in of two bathrooms back to back with its own stack for two sinks or one sink and one urinal or other rough-ins.

Figure 13:
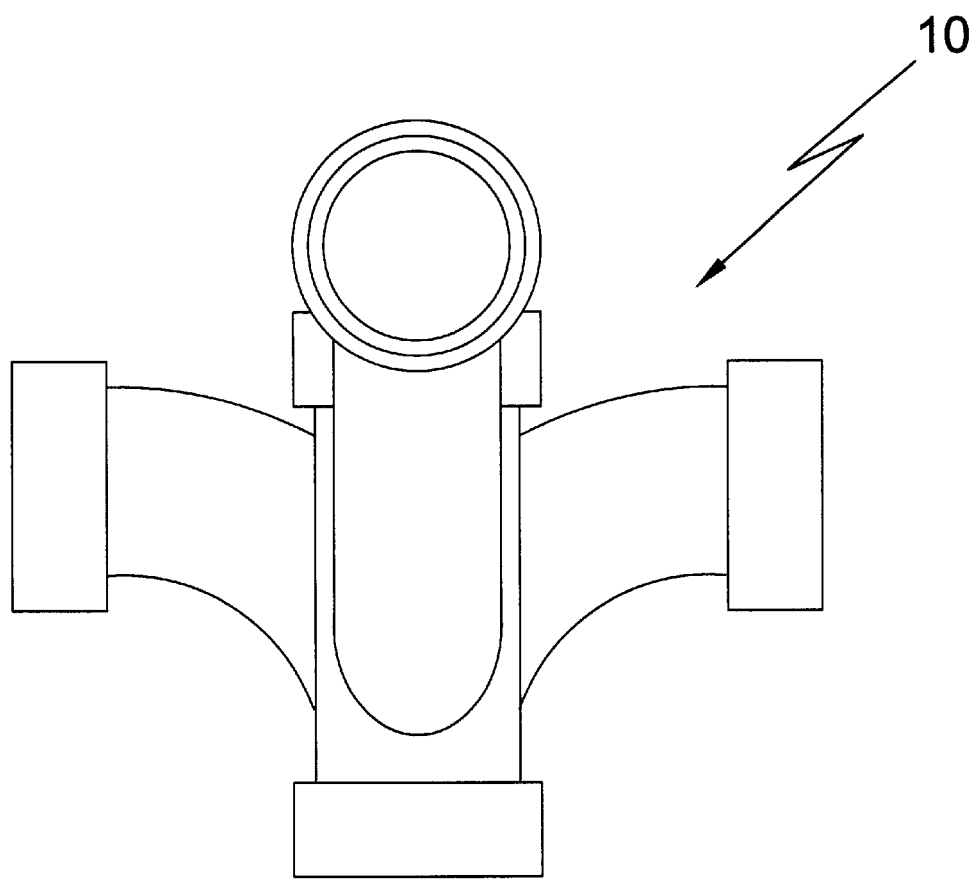
FIG. 13 is a front view of a three way combination fitting.

Turning to FIG. 13, shown therein is a front view of a variation of the present invention showing the three-way combination shown in FIG. 12.

Figure 14:
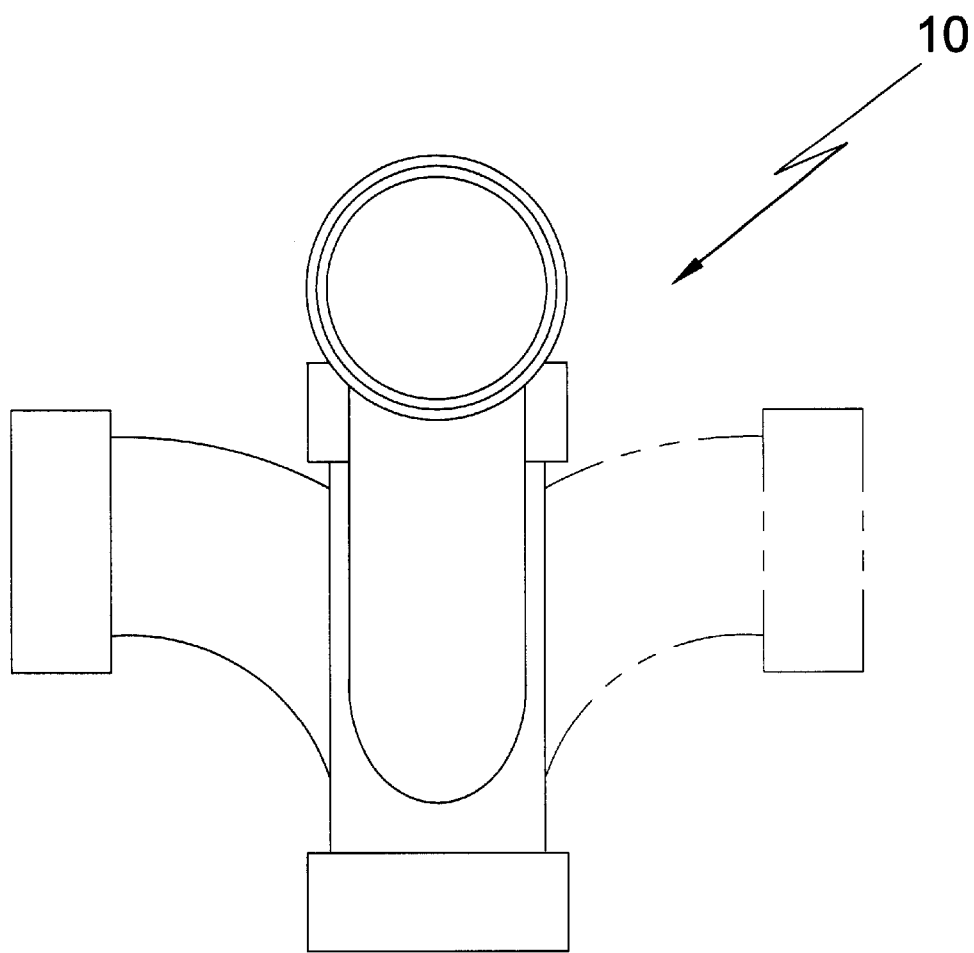
FIG. 14 is a front view of a left combination fitting with the placement of a right combination shown in phantom line.

Turning to FIG. 14, shown therein is a front view of a variation of the present invention showing a combination fitting that could be manufactured either for left or right installation as is depicted in phantom line.

Figure 15:
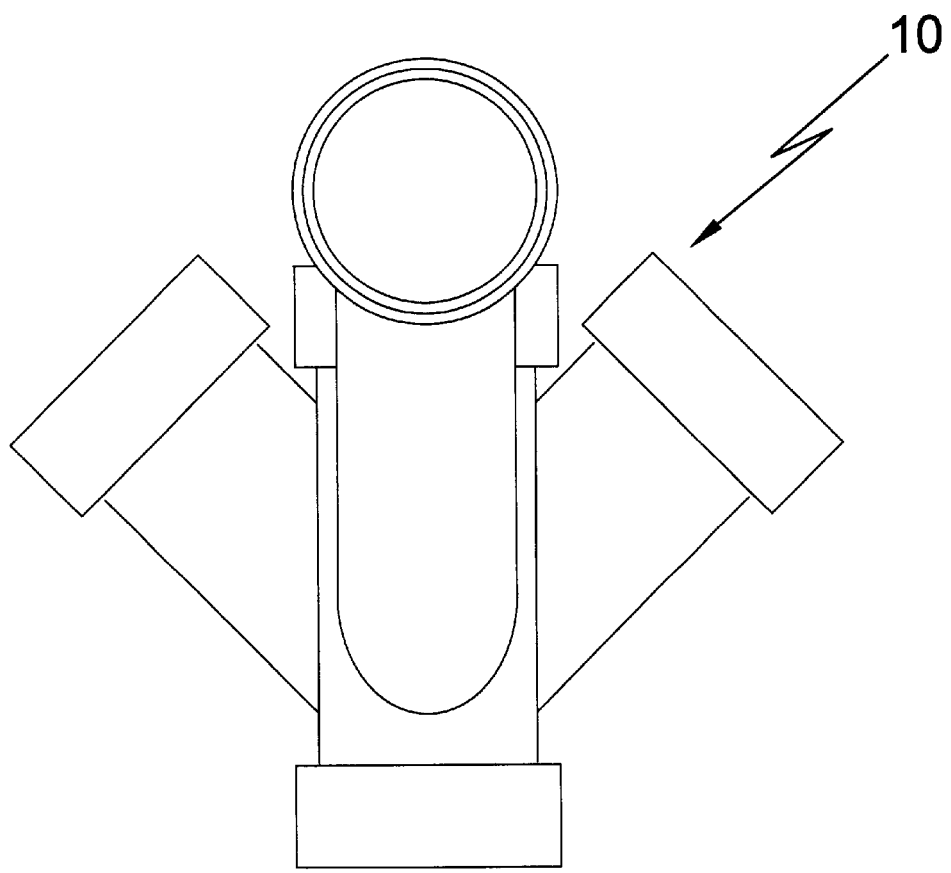
FIG. 15 is a front view of a double-Y fitting with a combination.

Turning to FIG. 15, shown therein is a front view of a variation of the present invention showing a double Y-fitting with a combination.

What is claimed to be new and desired to be protected by letters patent is set forth in the appended claims:

1. An apparatus for providing an adjustable plumbing fixture for connecting the tail piece of a sink to a drainpipe consisting of:

a) a trap, said trap further comprising a conduit having a bend therein, said trap having a first inlet end and a second outlet end;

b) a threaded portion disposed on said inlet end and said outlet end;

c) a pair of lock nuts for mating to said threaded portion of said inlet end and said outlet end;

d) an enlarged portion on both said outlet end and inlet end of said trap, said enlarged portions having a greater diameter than the drainpipe for receiving the end of the drainpipe therein and the tail piece of said sink, respectively;

e) a straight inlet pipe connected directly to said trap, through a wall of the enlarged portion of the inlet end of said trap between said inlet end of said trap and said bend of said trap for connection of a dishwasher outlet hose thereto, said inlet pipe being at right angles to said wall, the enlarged portion of the inlet end of said trap being longer than the enlarged portion of the outlet end of said trap;

f) a deflector within said trap for directing downwardly wastewater from said dishwasher entering said trap through said straight inlet pipe, said deflector comprising a curved member extending from an inside wall of said pipe above the inlet of said inlet pipe and extending downwardly and ending below the bottom of the inlet of said inlet pipe; and g) means for allowing the lowering of said trap when said drainpipe incorrectly roughed in requiring the trap to be lowered.

* * * * *